United States Patent

Malon et al.

[15] 3,682,512
[45] Aug. 8, 1972

[54] MEANS FOR CONTROLLING AND REGULATING THE BRAKING OF VEHICLES

[72] Inventors: Jean Pierre Malon, Maisons Alfort; Joseph W. Adde, Montfermeil, both of France

[73] Assignees: Compagnie des Freins et Signaux Westinghouse, Freinville-Sevran; Societe Inter-Elec, Aubervilliers, France

[22] Filed: Nov. 7, 1969

[21] Appl. No.: 874,778

[30] Foreign Application Priority Data

Nov. 13, 1968  France....................68173427

[52] U.S. Cl. ..............303/20, 188/181 A, 303/21 P
[51] Int. Cl. ..........................B60t 8/08, B60t 13/68
[58] Field of Search ..............188/181; 303/20, 3, 21; 324/162; 340/262

[56] References Cited

UNITED STATES PATENTS

| | | | |
|---|---|---|---|
| 3,158,409 | 11/1964 | Hughson et al..............303/15 |
| 3,374,035 | 3/1968 | Howard........................303/20 |
| 3,384,033 | 5/1968 | Ruff..............................105/61 |
| 3,398,995 | 8/1968 | Martin..................303/21 A X |
| 3,402,972 | 9/1968 | Cooper et al................303/20 |
| 3,494,671 | 2/1970 | Slavin et al............303/21 A X |
| 3,499,689 | 3/1970 | Carp et al. ............303/21 A X |
| 3,520,575 | 7/1970 | Steigerwald...........303/21 CG |
| 3,537,758 | 11/1970 | Buhler et al. ..........303/21 BE |
| 3,545,817 | 12/1970 | Yarber......................303/21 P |

*Primary Examiner*—Duane A. Reger
*Assistant Examiner*—Stephen G. Kunin
*Attorney*—McClure & Weiser

[57] ABSTRACT

The invention relates to a system for controlling and regulating the braking of a vehicle, comprising a braking circuit common to a plurality of wheels (or sets of wheels) of the vehicle, measuring means associated with each wheel (or set of wheels) for continuously producing individual signals which are direct functions of the decelerations of said wheels (or sets of wheels) respectively, anti-locking means responsive to the last mentioned signals respectively adapted to release locally the braking exerted on those of the wheels the decelerations of which exceed a predetermined threshold, a summing unit supplied with said individual signals delivering a working signal representative of the sum of said individual signals and a comparator of the working signal and of a signal which is representarive of a preset reference deceleration for the vehicle, adapted to slave the increase or decrease in braking power applied to the vehicle through the braking circuit to the difference between the two last mentioned signals, whereby the overcoming of the locking of a wheel is compensated by an increased braking action on the other wheels and therefore does not affect the execution of a preset deceleration program for the vehicle.

10 Claims, 1 Drawing Figure

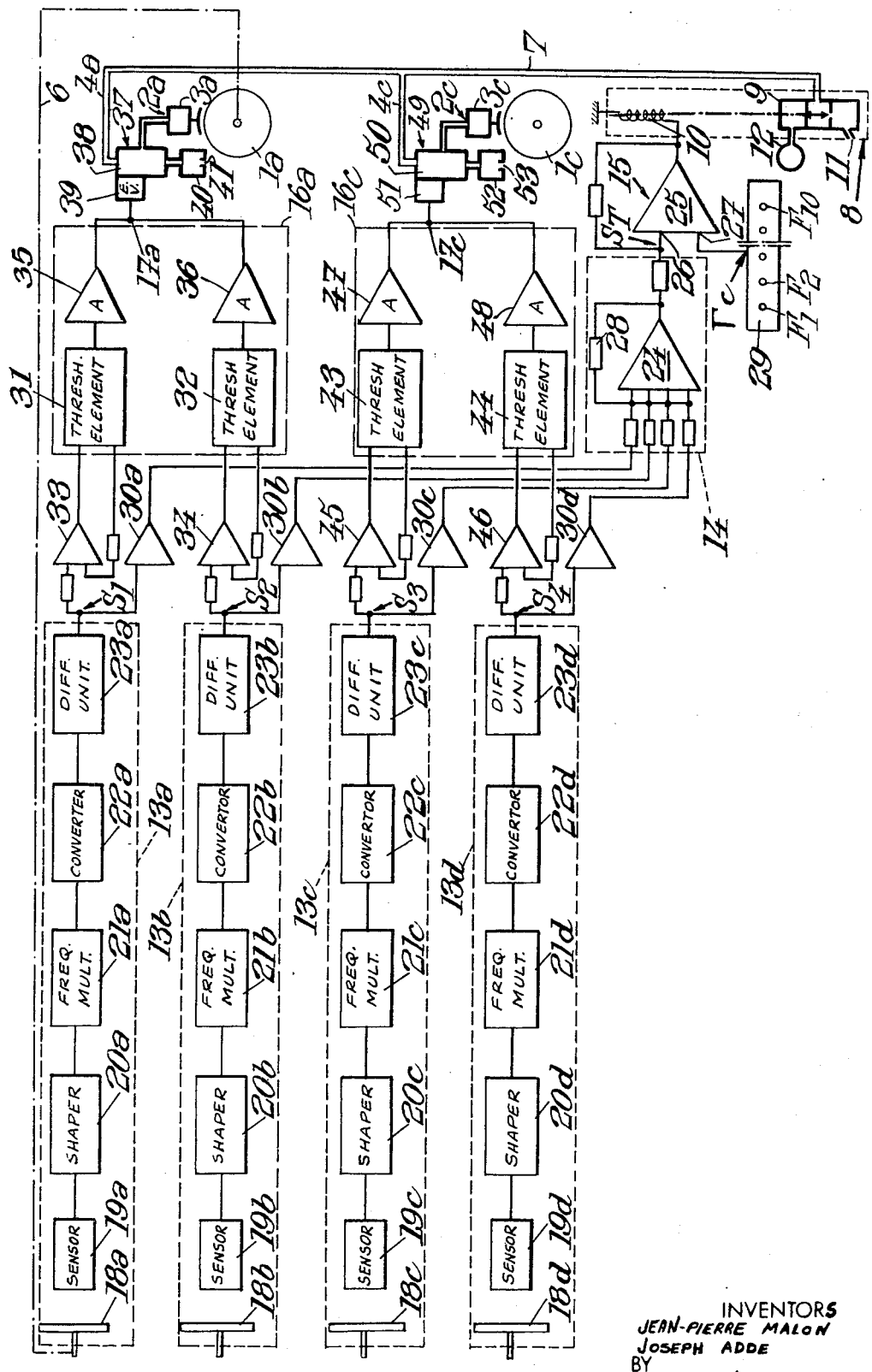

MEANS FOR CONTROLLING AND REGULATING THE BRAKING OF VEHICLES

This invention relates to means for controlling and regulating the braking of a vehicle, of the kind wherein the vehicle's braking system is slaved to the difference between a slowing down or braking command signal representative of a selected reference deceleration value and a signal continuously representative of the measured actual deceleration of the vehicle, in such manner as to cause, responsively to such slowing down commands, cancellation of said difference to within the precision capability of said control and regulating means. The invention relates more particularly though not exclusively to such control and regulating means as are designed for application to trains and motor vehicles.

In preferred embodiments of these control and regulating means, recourse is had, for the purpose of continuously measuring the actual deceleration of the vehicle (at least while said slowing down or braking command is applied), to means for measuring the angular velocity of a wheel axle which deliver a signal to a differentiating element which provides, at its output a signal which is at all times representative of said actual deceleration.

However, it is common knowledge that it is necessary, especially where railway vehicles are concerned, to equip the latter with means associated with each wheel or set of wheels which, during braking or slowing down of the vehicle, are adapted to prevent slipping or locking of these wheels on their associated tracks, particularly under the effect of accidental loss of adhesion. In a preferred embodiment of such means, the latter are capable, responsive to the sudden angular deceleration experienced by a wheel tending to become locked, of overriding, or at any rate releasing sufficiently, the braking force applied to the associated wheel or set of wheels in order to eliminate any risk of locking.

In addition to the fact that the wheel locking effect — which in itself has serious disadvantages in that it notably causes defects in wheel roundness — is liable to disrupt the actual-deceleration measurement required for the vehicle deceleration regulating function referred to, compensating for such locking tendency by releasing the brake also runs counter to proper implementation of the slowing down program imposed on the vehicle by said control and regulating means. It is accordingly the object of the present invention to provide improved control and regulating means of the kind referred to, and means for preventing accidental wheel locking, that are capable of engendering a braking effect to suit a predetermined deceleration program and of affording complete protection against wheel locking.

The present invention consists, principally — in a vehicle equipped with a braking circuit common to all the wheels (or sets of wheels) and, preferably, with anti-locking devices respectively associated with all wheels (or sets of wheels) each of which is capable of locally modifying the braking force which may be applied responsively to accidental perturbations affecting the corresponding wheel (or set of wheels subjected to the same command)— in continuously measuring, at least for the entire duration of application of a vehicle braking or slowing down command, the angular deceleration of each wheel (or set of wheels) and summing the same, in constituting the slowing down or braking command in the form of a reference quantity directly dependent upon a reference deceleration value of the vehicle, and in slaving the increase or decrease in the braking power applied to the vehicle to the difference between the sum of the angular decelerations on the several wheels (or sets of wheels) and the reference quantity.

In a preferred embodiment of a control and regulating device according to the invention for braking or slowing down a vehicle, said device includes measuring instruments associated with each wheel (or set of wheels) of the vehicle and severally capable of delivering, at least for the duration of application of a braking command to the vehicle, signals which are at all times functions of the actual decelerations of those wheels (or sets of wheels), and a summing element receiving as inputs all said signals and delivering a working signal which is a function at all times of the sum of said actual decelerations, the said reference quantity being a reference signal whose amplitude is equal to that which the working signal would possess if the vehicle were to be subjected to an actual deceleration equal to the reference deceleration, in the absence of any wheel locking or other unwanted effects, the braking system being slaved in such manner as to then tend to cancel out the difference between the reference signal and the working signal.

The braking control and regulating device preferably includes in addition anti-locking elements respectively associated with the wheels (or sets of wheels) of the vehicle, which elements severally utilize the signals delivered by the measuring instruments respectively associated with the same wheels (or sets of wheels), each such anti-locking element being devised so as to suppress, rapidly and momentarily, partly or completely, the braking force on the corresponding wheel (or set of wheels) when the signal issuing from the corresponding measuring instrument represents a deceleration exceeding a preset threshold.

The invention relates more particularly to certain specific applications (most notably to trains) and to certain specific forms of embodiment, and will be more clearly understood from the description which follows with reference to the accompanying non-limitative exemplary drawing.

The single figure in the drawing represents schematically and in the form of a block diagram a braking control and regulating device according to this invention, as applied to the wheels of a vehicle.

For a better understanding of the description which follows, consideration will first be given to the case of a single vehicle supported on two bogies, symbolically designated by 1a and 1c, each comprising two axles of which each receives a pair of wheels angularly rigid with each other, it being understood that all the wheels of the same bogie will be regarded as belonging to the same set of wheels, all subjected to the same control forces.

Those parts of the equipment of the vehicle other than the specific means which are the object of this invention may be constituted in any convenient manner, for instance by providing Westinghouse type brake units 2a, 2c, respectively associated to the two bogies and the brake cylinders 3a, 3c of which are supplied with a fluid at variable pressure through conduit members 4a, 4c connected to a common conduit 7 supplied with a fluid the pressure of which varies according to the required braking power.

The braking command operating on this pressure is preferably obtained through the medium of central control unit 8 comprising an electrically operated valve 9 (hereinafter referred to as an electrovalve) actuated by an electromagnet which is energized by a coil 10.

In its closed position (shown in the figure) which is obtained by energizing coil 10 with a current of given value I, electrovalve 9 interconnects conduit 7 with discharge port 11, whereby the braking force applied to the train is null. When the current in coil 10 decreases, electrovalve 9 causes conduit 7 to be supplied with fluid under pressure from a pressure-fluid source 12, whereby an increasing braking force is applied to the wheels of the train. In its open position, which is obtained with zero current, electrovalve 9 occupies a position which provides the train with maximum braking power.

The pressure of this fluid may be caused to be a direct function of the drop in current intensity through the coil 10. A direct-control electrovalve, i.e., one in which the braking pressure delivered increases with increasing current intensity flowing through coil 10, could be substituted for the electrovalve described precedingly. Each of the brake units 2a, 2c is furthermore associated to an anti-locking system, likewise well known per se, capable of releasing the braking force applied to the associated set of wheels when one of these wheels, or, in the specific instance herein considered by way of example, when one of the axles tends to lock for an unforeseen cause (such as an oil slick on the rail, or any other accidental impediment liable to cause momentary loss of adhesion of the wheel in question, or a transient maladjustment of the brake unit itself, etc.).

The anti-locking system 37 associated to brake unit 2a may comprise a slide-valve 38 having a two-position pneumatic relay connected into conduit 4a and controlled by an electrovalve schematically represented at 39. In its first position, slide-valve 38 places brake cylinder 3a in communication with main supply line 7 and in its second position causes brake cylinder 3a to be isolated from main supply line 7 and to communicate with an expansion chamber 40 having a calibrated external discharge orifice 41, whereby the braking force applied to the associated set of wheels is reduced.

The manner in which electrovalve 39 causes slide-valve 38 to be fetched rapidly and momentarily into its second position following incipient locking of one of the axles in the set thereof under consideration will now be described in greater detail.

It goes without saying that the other brake unit 2c is similarly associated to a companion wheel releasing system 49 comprising a pneumatic relay type slide-valve 50 connected into conduit element 4c of brake unit 2c, and electrovalve 51 capable of moving slide-valve 50 into a second position upon the onset of phenomena denoting a tendency for one of the axles of bogie 1c to lock, thereby causing brake cylinder 3c to communicate with an expansion chamber 52 having a calibrated orifice 53.

Considering next the regulating device portion of the present invention, the same includes measuring instruments 13a and 13b respectively associated to the two axles of the first bogie and delivering signals $S_1$ and $S_2$ which are functions respectively of variations in the angular velocity of said axles, as well as measuring instruments 13c and 13d respectively associated with the axles of the second bogie and delivering signals $S_3$ and $S_4$ which are functions respectively of the variations in the angular velocities of the latter axles, and, on the one hand, a summing unit 14 fed with the signals $S_1$, $S_2$, $S_3$ and $S_4$ and delivering a working signal $S_T$ which results from the summation of these four signals, and a brake-power slaving unit 15 activated by the difference between working signal $S_T$ and a reference signal $\Gamma c$ chosen according to the deceleration required for the train, and, on the other hand, devices 16a, 16c capable of sensing the sudden rapid deceleration caused by the onset of a phenomenon tending to lock one or the other of the axles of bogie 1a or one or the other of the axles of bogie 1c and, when said deceleration exceeds a preset threshold, of delivering, at one or the other of their respective outputs 17a and 17c, signals capable of energizing one or the other of electro-valves 39, 51 of anti-locking systems 36, 49 associated to brake units 2a, 2c.

Although the phenomenon leading to locking of the wheels may already have become incipient, for instance in the case of decelerations exceeding -1 meter per second per second in absolute value, it is preferable to set this threshold at a relatively high value, for example at -4 meters per second per second, in order to be able to discriminate between actual locking phenomena and other causes capable of producing significant variations in instantaneous decelerations, notably when the wheels run over rail joints, or any other track appliance or break in continuity of the track.

Since the measuring instruments 13a, 13b, 13c and 13d are preferably indentically devised, a description will be given hereinbelow of measuring instrument 13a, it being clearly understood that reference numerals differing only by their subscripts a, b, c or d designate like units. Whereas the measuring instrument 13a may have widely varying forms of embodiment, the embodiment illustrated in the accompanying single figure may be resorted to with advantage.

Measuring instrument 13a may include:

a gearwheel 18a angularly rigid (via a mechanical link symbolized by the dot-dash line 6) with the axle to which instrument 13a is associated, said gearwheel having teeth (not shown) made of magnetic material, a sensor 19a which comprises an air gap through which the teeth of gearwheel 18a move as the latter rotates and which delivers an alternating voltage of frequency proportional to the angular velocity of the rotating axle, a shaping unit 20a which transforms the alternating voltage issuing from the sensor into a series of square pulses, a frequency multiplier 21a which delivers a series of pulses the frequency of which is, say, double that of the train of pulses issuing from unit 20a and applied to multiplier 21a, whereby the resolving power of the measuring instrument is increased, notably when, because the train is travelling at low speed, the frequency of the alternating voltage produced by sensor 19a is relatively low, a converter 22a capable of converting the train of pulses issuing from multiplier 21a, notably into a direct voltage which is at all times proportional to the frequency of said train of pulses ; and a differentiating unit 23a capable of generating a signal $S_1$ which is the derivative of the D.C. voltage issuing from converter 22a. It should be noted that the voltage $S_1$ is at all times proportional to the rate of change of angular velocity of the axle to which measuring instrument 13a is associated and that the same applies in the case of voltages $S_2$, $S_3$ and $S_4$ respectively.

In a preferred form of embodiment of the invention, summing unit 14 is formed by an operational amplifier 24 connected in an adder configuration and receiving as inputs, through the medium of impedance matchers 30a, 30b, 30c, 30d, the signals $S_1$, $S_2$, $S_3$ and $S_4$. The slaving unit 15 is formed by an operational amplifier 25 connected in a subtractor configuration and receiving, through one input 26, a signal $S_T$ obtained through the medium of a potentiometer 28 which divides the value of the output signal from amplifier 24 by the number of signals $S_1$, $S_2$, $S_3$, $S_4$ (i.e. by four in this instance), and, through another input 27, the signal $\Gamma c$ representing the rate of deceleration chosen for the train.

This signal $\Gamma c$, which is the braking control signal, can assume different values to correspond to the required braking conditions and, in particular, may emanate from a manual control 29 for governing the speed of the train, having a plurality of notches $F_1$, $F_2$ . . . $F_{10}$ and which, depending on the notch selected, is capable of applying to the input 27 on operational amplifier 25, one of several predetermined reference deceleration values $\Gamma c$.

Obviously, this reference deceleration may issue from any other convenient source. In the case for example of an automatically driven vehicle, this reference deceleration could be applied to it from a preset program set up along the track followed by the vehicle, for instance (as well know per se) through the medium of a driver cable which is the seat of an electric current and is disposed along the track in such manner as to induce aboard the vehicle, at successive places along the track, signals which are automatically processed by the piloting system so as to correct the true decelerations of the vehicle, notably at places along its path at which it is required to slow down.

The output voltage from operational amplifier 25, which is at all times directly proportional to the difference between the reference deceleration $\Gamma c$ and the working signal $S_T$, is then applied to the input of the winding 10 of master braking control unit 8 through the medium of a power amplifier (not shown) delivering an output current capable of modulating the input current to winding 10, in order to command a reduction or increase in braking power that is at all times proportionate to the regulating action triggered by the measuring and summing devices, whereby to cause the difference between the voltages $\Gamma c$ and $S_T$ to tend to cancel out. It goes without saying that the subject control and regulating device of this invention must be capable of referencing the braking function to the deceleration of the train only when a braking command is actually applied to the device, and notably when one of the notches $F_1$ to $F_{10}$ of control 29 is selected. In particular, there must be no intervention by the said control device when the train is decelerated while under traction, for instance as it begins to ascend a gradient, and this can be accomplished by clamping the operational amplifier 25 when none of said notches is selected.

It is to be noted in particular that it is possible with a control and regulating device of this kind to impose a constant speed, notably when running downhill, provided that one of the predetermined reference values $\Gamma c$ capable of being applied to the input 27 of operational amplifier 25 is equal to zero.

Preferably, the sensing device 16a associated to the wheel braking unit 2a of the first bogie 1a comprises :

two threshold type elements 31 and 32, capable of switching from a first stable state to a second stable state when the signals $S_1$ and $S_2$ which they respectively receive via impedance matchers 33, 34 respectively exceed a given threshold corresponding, say, to an actual deceleration equal in absolute value to −4 meters per second per second, and capable subsequently of switching from the second to the first stable state when the signals $S_1$ and $S_2$ assume positive values corresponding to an acceleration of the wheels equal, for instance, to +3 meters per second per second, said threshold type elements being adapted, when in their second state, to energize the electrovalve 39 of anti-locking system 37 through power amplifiers 35, 36 whereby to rapidly, temporarily and at least partly remove the axles of bogie 1a from the action of braking unit 2a.

The sensing device 16c is similarly devised to the device 16a described hereinabove and includes two impedance matchers 45 and 46 feeding the signals $S_3$, $S_4$ to two threshold type elements 43 and 44 which, via power amplifiers 47 and 48, are capable of energizing the electrovalve 51 of anti-locking system 49 when the true deceleration measured on one of the axles of bogie 1c exceeds −4 meters per second per second. Manifestly, in the general case where there is no tendency for any of the vehicle axles to lock, the anti-locking systems will not be activated, so that the sum of the signals $S_1$, $S_2$, $S_3$, $S_4$ can then be regarded as being representative of the actual deceleration of the vehicle, with the signal obtained upon application of a braking command to the input 27 of operational amplifier 25 then representing the difference between the actual deceleration of the vehicle and the reference deceleration value. In such cases the control and regulating device of this invention will behave like the prior art devices referred to precedingly, making it is unnecessary to describe the manner of its operation in any detail.

In the event, however, of the onset of phenomena likely to cause locking of the axle of the bogie 1a associated with gearwheel 18a, the resulting sudden increase in deceleration will cause differentiating unit 23a to deliver a signal $S_1$ of likewise suddenly increasing magnitude, which, when it exceeds the threshold corresponding to a deceleration of −4 meters per second per second, causes threshold unit 31 to switch into its second state and thereby energizes electrovalve 39 of anti-locking system 37 and in turn causes the braking unit 2a operating on the wheels of bogie 1a to release its effect for as long as the tendency to lock lasts.

If, initially, the said increase in magnitude of signal $S_1$ should tend to reduce or even nullify the modulated control signal output from operational amplifier 25, the interruption in this tendency to lock, following activation of anti-locking system 37 (which interruption then causes threshold element 35 to revert to its first state), will tend on the contrary to enhance the braking pressure in the supply conduit 7 of the common braking circuit, due to the change in the sign of signal $S_1$ (resulting from the acceleration to which the released wheel is then subjected) and the attendant decrease in magnitude of working signal $S_T$. The brake unit 2c, which is not affected by the anti-locking effect, is then capable of acting as a back-up unit upon temporary failure of brake unit 2a, and to do so for as long as the tendency of the axle under consideration to lock is not definitively overcome.

Whereas the foregoing description has been confined for exemplary purposes to the case of a vehicle equipped with two bogies, each of which is associated to a single brake unit and a single anti-locking system, it goes without saying that it would be possible to utilize an independent anti-locking system for each axle of the same bogie (or even for each of the wheels if the latter are independent) that would be capable of rapidly, momentarily, and at least partly withdrawing, from the braking force applied to all the wheels of the bogie, only the specific axle under consideration (when it tends to lock).

Similarly, consideration has been given hereinbefore only to the case of an independent vehicle. Clearly, however, in the case of a train each coach of which is equipped with a braking force regulating system which is independent but nonetheless slaved to a control signal common to all the coaches of the train, it is possible to obtain even more precise regulation entirely independent of successively occurring local phenomena which denote a tendency of the axles on each coach to lock, owing for example to the presence of an oil slick on the rails at some specific place along the track, but which are in any case immediately compensated for.

It goes without saying that many changes and substitutions of parts may be made without departing from the scope of the invention and that, in its broader aspects, the invention is by no means limited to the specific examples of application hereinbefore described for purely examplary purposes.

For instance, the anti-locking system described precedingly could be replaced by any other known type of anti-locking or releasing system such as a system of the kind based on a comparison between the speeds of two or more neighboring wheels.

Further, it would alternatively be possible to regulate the acceleration of a vehicle, the brake units being then replaced by traction units and the anti-locking systems by devices which, in the event of wheel slip, are designed either to reduce the traction force or to improve wheel adhesion on the track (by sanding for example).

In particular, the device for controlling and regulating the running conditions of a vehicle, described hereinabove with reference to braking or slowing down of the vehicle, could additionally include a summing unit so devised as to be capable also of referencing an increase or decrease in traction power to the difference between the accelerations measured (e.g. by said measuring instruments) and a traction command dependent upon a preset reference acceleration value, and units which would each process the signal furnished by said measuring instruments whereby to rapidly, momentarily and at least partly suppress the traction force applied to the associated wheels whenever the signal delivered by the measuring instrument associated with one of the wheels (or sets of wheels) of the vehicle represents an acceleration (tendency to slip) of said wheel (or said set of wheels) in excess of a preset threshold.

What is claimed is:

1. In a control system for a vehicle having a plurality of wheels and means for applying force thereto to change the speed of rotation thereof, the improvement comprising means responsive to the rotational speeds of the respective traction wheels and adapted to provide outputs proportional to rate of change therein, means for relieving the force applied to any wheel when the output so provided therefrom exceeds a certain value, means for summing the outputs so provided and for comparing the sum thereof with a predetermined value, and means responsive to the result of such comparison and adapted to alter the applied force so as to equalize the output sum to the predetermined value.

2. Control system according to claim 1, wherein the last means comprises a plurality of speed-altering means, each operatively connected to a separate plurality of independently rotatable traction wheels, individually provided with aforesaid speed-sensing means and force-relieving means.

3. A system for controlling and regulating the braking of a vehicle which comprises a braking circuit common to a plurality of wheels (or sets of wheels) of the vehicle, measuring means associated with each of said wheels (or sets of wheels) severally adapted to deliver, at least for the entire duration of application of a braking effort on said wheels, individual electrical signals the values of which are respectively proportional at all times to the actual decelerations of the associated wheels (or sets of wheels), anti-locking means respectively associated with said wheels (or sets of wheels) each of which is individually responsive to the corresponding individual electrical signal for at least partly, rapidly and momentarily, eliminating the braking force exerted on the corresponding wheel (or set of wheels) when said individual signal exceeds a predetermined threshold, a summing unit for summing all of said individual electric signals and delivering a working signal dependent at all times upon the sum of said individual electric signals, referencing means for producing a braking or slowing down signal, representative of a preset reference deceleration for the vehicle, and control means for slaving the braking power applied to all wheels (or sets of wheels) through said braking circuit to the difference between said braking or slowing down command signal and said working signal.

4. A system according to claim 3, wherein the value of said braking or slowing down command signal is equal to the value which the working signal would have if the vehicle were subjected to an actual deceleration equal to the said preset reference deceleration, in the absence of any wheel-locking tendency or other disrupting factor.

5. A system according to claim 4, wherein said control means are adapted to slave the braking power applied to said wheels through said common circuit such as to cause the difference between the braking or slowing down command signal and the working signal to be cancelled out.

6. A system according to claim 5, wherein the summing element comprises a first operational amplifier connected in a summing configuration and receiving upon its various inputs the signals supplied by all of said measuring means and said control means include a second operational amplifier connected in a subtractor configuration and receiving through a first input the working signal issuing from the first operational amplifier and through another input the braking or slowing down command signal.

7. A system according to claim 3, wherein said anti-locking means respectively comprise threshold type elements each adapted to switch from a first to a second stable state when the individual signal so delivered and applied to its input exceeds said threshold, whereupon said anti-locking means is actuated to effect said rapid and momentary elimination of the braking force on the wheels (or sets of wheels) associated therewith.

8. A system according to claim 7, wherein said threshold type elements are additionally adapted to switch from the second to the first stable state when the individual signals applied to their respective inputs assume a positive value corresponding to a certain acceleration of the wheels, whereupon said anti-locking means returns to its former condition and said momentarily eliminated braking force is reasserted.

9. A system for controlling and regulating the braking of a vehicle which comprises brake means operable by a fluid under pressure and associated with each of a plurality of wheels (or sets of wheels) of the vehicle, a conduit common to said brake means for supplying said fluid thereto and electrovalve means controlled by a control signal to regulate the pressure of said fluid in said conduit, measuring means associated with each of said wheels (or sets of wheels) severally adapted to deliver, at least for the entire duration of application of a braking effort on said wheels, individual electrical signals the values of which are respectively proportional at all times to the actual decelerations of the associated wheels (or sets of wheels), anti-locking means respectively associated with each of said wheels (or sets of wheels) each of which comprises a threshold type element supplied on its input with the individual electric signal delivered by the corresponding measuring means and adapted to switch from a first to a second stable state when said individual signal exceeds a given threshold, whereupon said anti-locking means is adapted to effect a rapid and momentary elimination of the braking force applied on the wheel (or set of wheels) associated therewith, and to switch back from the second to the first stable state, when said individual signal assumes a positive value corresponding to a certain acceleration of the corresponding wheel (or set of wheels), whereupon said anti-locking means returns to its former condition and said momentarily eliminated braking force is reasserted, a first operational amplifier connected in a summing configuration and receiving upon its various inputs the individual signals supplied by all of said measuring means and delivering a working signal dependent at all times upon the sum of said individual signals, referencing means for producing a braking or slowing down signal representative of a preset reference deceleration for the vehicle, a second operational amplifier connected in a subtractor configuration and receiving on a first input said working signal and on another input said braking or slowing down command signal and delivering an output signal dependent at all times upon the difference of said working signal and said braking or slowing down command signal, said output signal constituting said control signal.

10. A system for controlling and regulating the traction of a vehicle which comprises a traction circuit common to a plurality of wheels (or sets of wheels) of the vehicle, measuring means associated with each of said wheels (or sets of wheels) severally adapted to deliver, at least for the entire duration of application of a traction effort on said wheels, individual electric signals the values of which are respectively proportional at all times to the actual decelerations of the associated wheels (or sets of wheels)

anti-slipping means respectively associated with each of said wheels (or sets of wheels), individually responsive to the corresponding individual electric signal for at least partly, rapidly and momentarily, eliminating the traction force exerted on the corresponding wheels (or sets of wheels) when said electrical individual signal exceeds a predetermined threshold, a summing unit for summing all of said individual electrical signals and delivering a working signal dependent at all times upon the sum of said individual electric signals, referencing means for producing a traction signal representative of a preset reference acceleration for the vehicle, and control means for slaving the traction power applied to all wheels (or sets of wheels) through said circuit to the difference between the traction signal and said working signal.

* * * * *